Figure 1:
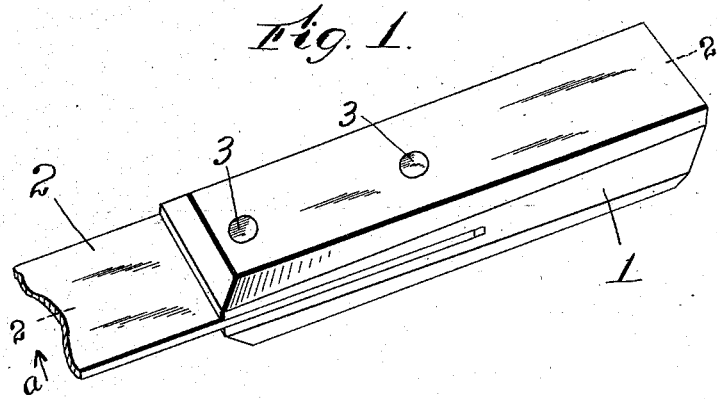

No. 749,438. PATENTED JAN. 12, 1904.
C. D. HARRINGTON.
RIVET.
APPLICATION FILED MAY 18, 1903.
NO MODEL.

Witnesses:
C. F. Wilson.
M. Haas.

Inventor:
C. D. Harrington.
By his Attorney,
John C. Dewey.

No. 749,438. Patented January 12, 1904.

UNITED STATES PATENT OFFICE.

CHARLES D. HARRINGTON, OF SOUTHBRIDGE, MASSACHUSETTS, ASSIGNOR TO HARRINGTON CUTLERY COMPANY, OF SOUTHBRIDGE, MASSACHUSETTS.

RIVET.

SPECIFICATION forming part of Letters Patent No. 749,438, dated January 12, 1904.

Application filed May 18, 1903. Serial No. 157,511. (No model.)

*To all whom it may concern:*

Be it known that I, CHARLES D. HARRINGTON, a citizen of the United States, residing at Southbridge, in the county of Worcester and State of Massachusetts, have invented certain new and useful Improvements in Rivets, of which the following is a specification.

My invention relates to rivets, and particularly to that class of rivets which are made in two parts; and the object of my invention is to make an improved rivet of simple construction and of varying length, if desired.

My improved rivet is made in two parts, and each part has a solid or imperforated enlarged end or head, and one part has a solid post extending from the head, preferably of uniform diameter throughout its length except at its extreme end, which is made a little smaller and tapering, and the other part has a tubular or hollow post extending from the head, the length of which is substantially the same as the solid post on the other part and the internal diameter of which is preferably uniform and a little less than the external diameter of the solid post.

The two parts of my rivet are secured together and also secured in the hole in which they are placed by inserting the tapering end of the solid post into the open end of the tubular post and then hammering or forcing the solid post into the tubular post. The external diameter of the solid post being a little greater than the internal diameter of the tubular post, the driving of the solid post into the tubular post will slightly enlarge the tubular post and cause it to expand and to be held very tightly in the hole in which it is inserted, and at the same time the solid post will be held very securely in the tubular post as soon as the tapering end thereon has entered beyond the outer end of the tubular post, so that the two parts of my rivet will be firmly and securely fastened together and also fastened in the hole in which they are inserted without regard to the distance the solid post extends into the tubular post, whether more or less, thus making a rivet of varying length, according to the thickness of the article or the length of the hole in which the rivet is used.

I have shown in the drawings a knife-handle and part of a knife-blade with my improved rivets for securing the blade to the handle.

Figure 2:
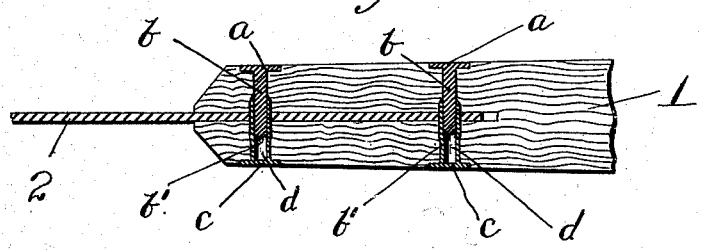
Figure 3:
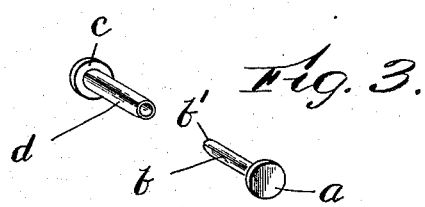
Figure 4:
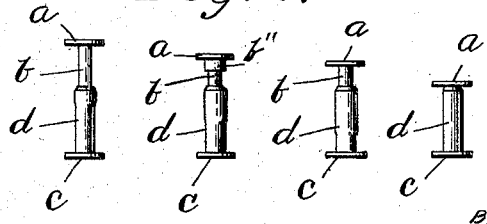

Referring to the drawings, Figure 1 is a perspective view of a knife-handle and a portion of a knife-blade and two of my rivets securing them together. Fig. 2 is a section on line 2 2, Fig. 1, looking in the direction of arrow *a*, same figure. Fig. 3 is a perspective view of the two parts of my rivet detached; and Fig. 4 shows four of my rivets of different length, as will be hereinafter described.

In the accompanying drawings, 1 is a knife-handle slit at one end to receive the end of the knife-blade 2. Through the handle 1 and knife-blade 2 are in this instance two holes to receive the rivets 3, which secure the blade 2 to the handle 1.

The rivets 3 are made in two parts. One part has a solid or imperforated head or enlarged end *a* and a solid post *b*, extending out therefrom and integral therewith. The post *b* is preferably of uniform diameter throughout its length except its extreme end or point *b'*, which is made a little smaller and tapering. The other point of the rivet 3 has also a solid or imperforated head or enlarged end *c*, preferably of the same size as the head *a*, and a tubular or hollow post *d*, preferably of uniform external and internal diameter throughout its length except its extreme end, which is made slightly tapering externally. The internal diameter of the tubular post *d* is a little less than the external diameter of the post *b*, so that the post *b* will be a tight fit in the tubular post *d*, and the hammering or forcing of the post *b* into the tubular post *d* will cause said post *d* to expand slightly, as shown in the drawings, and thus bind and secure it firmly and securely in the hole in which it extends, and at the same time the pressure of the tubular part *d* on the solid part *b* will serve to bind and hold very firmly and securely the post *b* in the part *d* without regard to how far the part *b* extends within the part *d*. The posts *b* and *d* are preferably of uniform length, and the post *b* may extend entirely within the tubular part *d*, as shown at the right in Fig. 4, to make a short rivet, or may extend partially within the post $d$, as shown in Fig. 2 and in Fig. 4, to make a longer rivet or rivets of varying length, if desired, according to the length of the hole in which the rivet is used.

The advantages of my improved rivet will be readily appreciated by those skilled in the art. It is of very simple construction. Each of the two parts has a solid end or head made integral with the post extending out therefrom. The two parts are secured together by simply inserting the tapering end of the solid post into the open end of the tubular post and driving it in a distance corresponding to the length of the rivet desired.

It will be understood that the details of construction of my rivet may be varied, if desired. Instead of making the head round, as shown, it may be made of any other shape, if preferred, and on the solid post $b$ there may be an enlargement under the head $a$, as shown at $b''$, Fig. 4, making the post $b$ at this part of the same diameter as the external diameter of the tubular post $d$.

Having thus described my invention, what I claim as new, and desire to secure by Letters Patent, is—

1. A rivet made in two parts, each part having a solid integral head or enlarged end, and one part having a solid post extending from the head, the other part having a hollow post of substantially uniform diameter throughout extending from its head, both the solid post and the hollow post being adapted to penetrate the material through which the rivet is to pass, and said solid post being of a larger diameter than the internal diameter of the tubular post to thereby enable the solid post to be forced into the tubular post to varying distances and to permanently expand the tubular post when it is forced therein, substantially as described.

2. A rivet made in two parts, each part having a solid head or enlarged end, one part having a solid post extending from the head and provided with a tapering end, said post having also an enlargement under the head, and the other part having a hollow post of substantially uniform diameter throughout, both the solid post and the hollow post being adapted to penetrate the material through which the rivet is to pass, said solid post being of a larger diameter than the internal diameter of the tubular post thereby enabling the solid post to be forced into the tubular post to varying distances according to the length of rivet required and to permanently expand the tubular post when it is forced therein.

CHAS. D. HARRINGTON.

Witnesses:
LEO F. OLDS,
R. M. RUMGARD.